Nov. 28, 1944.　　　J. E. DUGGAN　　　2,363,660
BEARING MASK STRUCTURE
Filed April 8, 1942
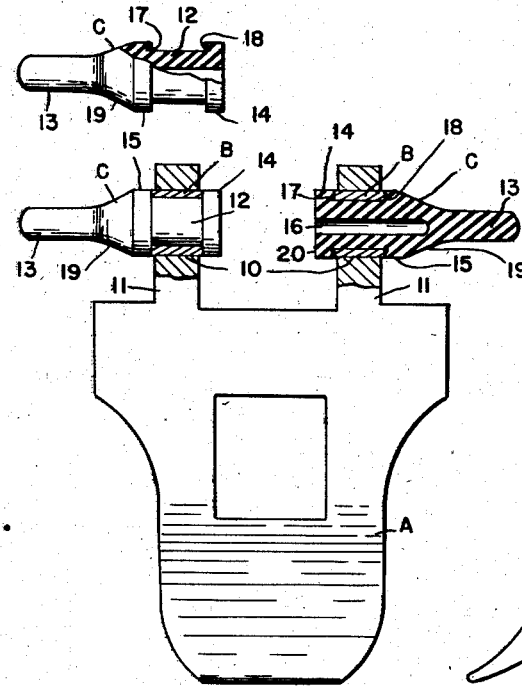
FIG.4.
FIG.2.
FIG.1.
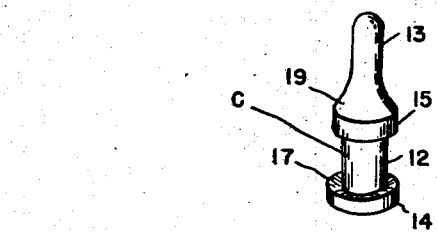
FIG.3.
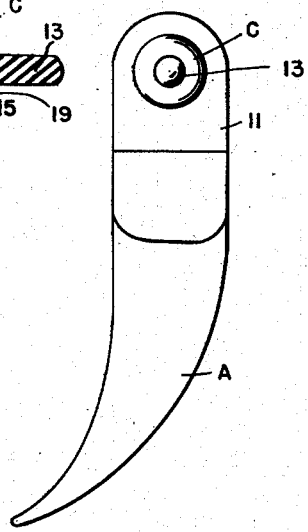
INVENTOR.
JAMES EDWARD DUGGAN
BY
ATTORNEYS Patented Nov. 28, 1944

2,363,660

UNITED STATES PATENT OFFICE 2,363,660

BEARING MASK STRUCTURE

James Edward Duggan, Detroit, Mich.

Application April 8, 1942, Serial No. 438,188

13 Claims. (Cl. 91—65)

This invention relates generally to devices that are used during painting or plating operations to protect articles or portions thereof from paint applied to adjacent articles or portions and refers more particularly to paint masks for tubular elements such as tubular or sleeve type bearings and the like.

One of the essential objects of the invention is to provide a mask capable of protecting the bearing while it is assembled with the article or portion to be painted or plated and that may accomplish this without interfering with or obstructing the painting or plating operation.

Another object is to provide a mask that will effectively cover and protect at one time all exposed portions including the bearing surface of a sleeve type bearing and will thereby prevent any paint or plating substance applied to the article or portion thereof with which the bearing is assembled from reaching the bearing.

Another object is to provide a mask that may be easily and quickly applied to the bearing, that will grip the bearing tightly while applied thereto, and that may be easily and quickly removed from the bearing without marring the paint or plating applied to the article or portion thereof with which the bearing is assembled.

Another object is to provide a mask that is simple in construction and economical to manufacture.

Other objects, advantages and novel details of construction of this invention will be made more apparent as this description proceeds, especially when considered in connection with the accompanying drawing, wherein:

Figure 1 is a plan view of a hasp, showing parts thereof broken away and in section and showing masks embodying my invention applied to sleeve type bearings within arm portions of the hasp;

Figure 2 is an end view of the structure shown in Figure 1;

Figure 3 is a perspective view of a mask embodying my invention;

Figure 4 is another view of the mask, with parts broken away and in section.

Referring now to the drawing, A is a hasp of a latch for an electric starter housing of an airplane, B are tubular or sleeve type bearings extending through aligned holes 10 in substantially parallel arms 11 of said hasp, and C are masks embodying my invention and extending through and protecting the bearings B from paint or plating material applied to the hasp A.

As shown, the length of the bearings B is slightly greater than the length of the holes 10 so that opposite ends of the bearings project slightly beyond opposite ends of the holes.

Each mask C is preferably formed of resilient material such as rubber or rubber composition and has a substantially cylindrical body 12 and a reduced substantially cylindrical endwise extension 13.

The body 12 is provided at spaced points longitudinally thereof with annular flanges 14 and 15 and has an axially extending socket 16. The flange 14 is at one end of the body and has an undercut inner face 17, while the flange 15 is at the inner end of the extension 13 and also has an undercut inner face 18. Preferably this flange 15 has a frusto-conical portion 19 that tapers from the outer side thereof to and is integral with the inner end of the extension 13. The socket 16 extends from a point adjacent the inner end of the extension 13 to and opens through the flanged end 20 of the body. The extension 13 is preferably solid and constitutes a finger piece for the body 12.

In use, the extension 13 and frusto-conical portion 19 cooperate with each other to provide a pilot for the body 12 to facilitate its insertion within one of the bearings B. The axial socket 16 permits sufficient contraction of the body 12 to enable the frusto-conical portion 19 and flange 15 to be inserted into and moved in either direction through the bearing B. Initially, the extension 13 and frusto-conical portion 19 are inserted in the order named into one end of the bearing B until the large end of the frusto-conical portion 19 abuts the adjacent end of the bearing. At this stage the extension 13 projects through and is accessible beyond the other end of the bearing. Then the extension 13 is pulled endwise by hand in an outward direction relative to the bearing so that the frusto-conical portion 19 and flange 15 will be drawn through the bearing. During this stage the body 12, flange 15 and frusto-conical portion 19 will be stretched and contracted so as to pass through the bearing. The end flange 14 will abut the adjacent end of the bearing just before the flange 15 is drawn beyond the other end of the bearing as aforesaid. Consequently when the extension 13 is released after the flange 15 has been pulled through the bearing, the resiliency of the stretched body will cause it to shorten and expand into snug engagement with the inner walls of the bearing and will cause the undercut faces 17 and 18 of the flanges 14 and 15 to embrace and fit tightly over the ends of the bearing B. When in this position, the flanges 14 and 15 not only cover the ends of the bearing but abut the adjacent faces of the arm 11 containing said bearing. Consequently all portions of the bearing are covered and protected by the mask from paint or plating material subsequently applied to the hasp A.

After the painting or plating operation has been completed the mask may be easily withdrawn from the bearing by simply squeezing the flange 15 and frusto-conical portion 19 and pushing them back through the bearing. This may be facilitated by pulling at the same time the flanged end 20 of the body outward relative to the bearing.

Thus, from the foregoing, it will be apparent that I have provided a simple and inexpensive mask that may be easily and quickly applied to and removed from the bearing without marring it or the hasp or other article with which the bearing may be assembled and that will serve effectively and efficiently to protect the bearing from the paint or plating substance when applied to the hasp.

What I claim as my invention is.

1. A masking device for covering the interior and end portions of a sleeve type bearing so that said portions will be protected from paint or plating material applied to a holder for said bearing, comprising an elongated element having a socket in one end thereof, said element being adapted to substantially fill the interior of the bearing and provided at longitudinally spaced points thereof with lateral flanges adapted to overlie opposite ends of the bearing, said socket being small in comparison with the cross section of said element and means at one end of said element operable as a finger piece to actuate the element and flanges relative to said bearing.

2. A one piece resilient masking device for covering the interior and end portions of a sleeve type bearing so that said portions will be shielded from paint or plating material applied to a holder for said bearing, comprising a cylindrical element having a socket in one end thereof, said element being adapted to substantially fill the interior of the bearing and provided at longitudinally spaced points thereof with lateral flanges adapted to overlie opposite ends of the bearing, said socket being small in comparison with the cross section of said element and means at one end of said element operable initially as a pilot for the cylindrical element to facilitate its insertion within the bearing and operable thereafter as a finger piece to move the element lengthwise within the bearing.

3. A masking device for protecting a tubular portion of an assembly from paint or plating material applied to an adjacent portion of the assembly, comprising a resilient member having an elongated body having a socket in one end thereof, said body being adapted to substantially fill the interior of the tubular portion, flanges at longitudinally spaced points of the elongated body for covering opposite ends of said tubular portion, said socket being small in comparison with the cross section of said body and an endwise extension operable as a finger piece to actuate the body and flanges relative to said tubular portion.

4. A masking device for protecting a tubular portion of an assembly from paint or plating material applied to an adjacent portion of the assembly, having an elongated body having a socket in one end thereof, said body being adapted to substantially fill the interior of the tubular portion, flanges at longitudinally spaced points of the elongated body for covering opposite ends of said tubular portion, said socket being small in comparison with the cross section of said body and means at one end of the body operable as a finger piece to actuate the body and flanges relative to said tubular portion.

5. An elongated mask for a tubular element, comprising an elongated body having a socket in one end thereof, said body being formed of resilient material and adapted to be inserted into and moved lengthwise within the tubular element, flanges at spaced points longitudinally of the body for gripping opposite ends of said element, said socket being small in comparison with the cross section of said body, a pilot for the body on one of said flanges, and an endwise extension on the pilot operable as a finger piece for moving the pilot, flange adjacent thereto, and body lengthwise within the tubular element.

6. A one piece mask for a tubular element, comprising an elongated body having a cylindrical portion having a socket in one end thereof, said element being adapted to be inserted into and moved lengthwise within the tubular element, said socket being small in comparison with the cross section of said element flanges at longitudinally spaced points of the cylindrical portion for overlying opposite ends of the tubular element, a portion on one of said flanges for piloting the cylindrical portion into said element, and a portion projecting endwise from the piloting portion and operable as a finger piece to move the cylindrical portion lengthwise within the tubular element.

7. A one piece mask for a tubular element, comprising a body having a socket in one end thereof, said body being adapted to substantially plug the interior of the tubular element, said socket being small in comparison with the cross section of said element flange portions at longitudinally spaced points of the body for embracing opposite ends of said element, and an endwise extension on one of said flanges operable as a finger piece for moving the body lengthwise within the tubular element.

8. A one piece mask for a tubular element comprising an elongated body of resilient material adapted to substantially fill the tubular element and provided at spaced points longitudinally thereof with lateral flanges having undercut faces for embracing opposite ends of said tubular element, said body being contractible upon being moved lengthwise within the tubular element to permit one of said flanges to be drawn through said element, and means at one end of the body operable as a finger piece to move the body lengthwise within the tubular element.

9. Means for protecting the interior surface of a tubular member from paint or plating material applied to other portions of said member or to a holder for said member, comprising a mask having an elongated body having a socket in one end thereof, said body being adapted to be inserted into the interior of the tubular member to substantially fill the same, said body being provided at longitudinally spaced points thereof with lateral flanges for abutting engagement with opposite ends of the tubular member, said body being formed of resilient material and said socket being small in comparison with the cross section of the body whereby the body is contractible to permit one of said flanges to be inserted into said tubular member.

10. Means for protecting the interior surface of a tubular member from paint or plating material applied to other portions of said member or to a holder for said member, comprising a mask having an elongated body having a socket in one end thereof, said body being adapted to be inserted into the interior of the tubular member to substantially fill the same, said body being provided at longitudinally spaced points thereof with lateral flanges for abutting engagement with opposite ends of the tubular member, said body being formed of resilient material and said socket being small in comparison with the cross section of the body whereby the body is contractible to permit one of said flanges to be inserted into said tubular member, said body being provided at one end adjacent the socket with an endwise extension constituting a finger piece by which the flange aforesaid may be pulled through the tubular member after being inserted into the same.

11. Means for protecting the interior surface and opposite end portions of a tubular member from paint or plating material applied to a holder for said member, comprising a mask having a stretchable elongated body having a socket in one end thereof, said body being adapted to be inserted into the interior of the tubular member to substantially fill the same, said body being provided at longitudinally spaced points thereof with lateral flanges for abutting engagement with opposite ends of the tubular member, said socket being small in comparison with the cross section of the body whereby the body is contractible to permit one of said flanges to be inserted into said tubular member.

12. Means for protecting the interior surface and opposite end portions of a tubular member from paint or plating material applied to a holder for said member, comprising a mask having a stretchable elongated body having a socket in one end thereof, said body being adapted to be inserted into the interior of the tubular member to substantially fill the same, said body being provided at longitudinally spaced points thereof with lateral flanges for abutting engagement with opposite ends of the tubular member, said socket being small in comparison with the cross section of the body whereby the body is contractible to permit one of said flanges to be inserted into said tubular member, said body being provided at one end adjacent the socket with an endwise extension constituting both a pilot for the body to facilitate its insertion within the tubular member and a finger piece by which the flange aforesaid may be pulled through the tubular member after being inserted into the same.

13. Means for protecting the interior surface of a tubular member from paint or plating material applied to other portions of said member or to a holder for said member, comprising a mask having an elongated body having a socket in one end thereof, said body being adapted to be inserted into the interior of the tubular member, said body being provided at spaced points longitudinally thereof with lateral flanges for abutting opposite ends of said tubular member, said body being provided at one end with an endwise extension by which the body may be actuated relative to said tubular member, said body being formed of resilient material and said socket being small in comparison with the cross section of the body and being axially disposed whereby the body is contractible when inserted into said tubular member to enable one of said flanges to be inserted into and pulled through the tubular member by the endwise extension.

JAMES EDWARD DUGGAN.